United States Patent
Yang et al.

(10) Patent No.: US 11,284,239 B2
(45) Date of Patent: Mar. 22, 2022

(54) CENTRAL NODE MANAGEMENT OF UE CONTEXT

(71) Applicant: Telefonaktiebolaget LM Ericsson (publ), Stockholm (SE)

(72) Inventors: Yong Yang, Kållered (SE); Gunnar Rydnell, Gothenburg (SE); Anders Fredén, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 16/072,841

(22) PCT Filed: Feb. 15, 2016

(86) PCT No.: PCT/EP2016/053143
§ 371 (c)(1),
(2) Date: Jul. 25, 2018

(87) PCT Pub. No.: WO2017/140338
PCT Pub. Date: Aug. 24, 2017

(65) Prior Publication Data
US 2019/0037383 A1    Jan. 31, 2019

(51) Int. Cl.
*H04W 8/02* (2009.01)
*H04W 8/18* (2009.01)
(Continued)

(52) U.S. Cl.
CPC ............ *H04W 8/02* (2013.01); *H04W 8/18* (2013.01); *H04W 36/0022* (2013.01);
(Continued)

(58) Field of Classification Search
None
See application file for complete search history.

(56) References Cited

U.S. PATENT DOCUMENTS

2010/0299419 A1* 11/2010 Ramankutty ......... H04W 24/02
 709/221
2013/0301611 A1 11/2013 Baghel et al.
(Continued)

FOREIGN PATENT DOCUMENTS

CN    102316543 A    1/2012
CN    103731811 A    4/2014
(Continued)

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
(Continued)

*Primary Examiner* — Kenny S Lin
*Assistant Examiner* — Richard Schnell
(74) *Attorney, Agent, or Firm* — Withrow & Terranova, PLLC

(57) ABSTRACT

The invention relates to a node in a communications network for enabling communication with at least one wireless communication terminal served by the communications network. According to an embodiment, the node stores at least one current User Equipment (UE) context of the at least one communication terminal to be used by a first network entity of the plurality of network entities in the communications network; receives, from a second network entity of the plurality of network entities, a message intended for the first network entity; and delivers at least a part of the received message to the first network entity and at least a part of the stored at least one current UE context to be used by the first network entity.

18 Claims, 6 Drawing Sheets

(51) Int. Cl.
  *H04W 88/14* (2009.01)
  *H04W 36/00* (2009.01)
  *H04W 68/00* (2009.01)
  *H04W 88/08* (2009.01)
  *H04W 8/08* (2009.01)

(52) U.S. Cl.
  CPC ......... *H04W 68/005* (2013.01); *H04W 88/08* (2013.01); *H04W 88/14* (2013.01); *H04W 8/08* (2013.01); *H04W 68/00* (2013.01)

(56) References Cited

U.S. PATENT DOCUMENTS

| | | | | |
|---|---|---|---|---|
| 2014/0022996 | A1* | 1/2014 | Punz | H04W 36/12 370/328 |
| 2016/0255554 | A1* | 9/2016 | Ke | H04W 12/06 455/436 |
| 2018/0288643 | A1* | 10/2018 | Schmidt | H04W 76/10 |

FOREIGN PATENT DOCUMENTS

| | | |
|---|---|---|
| CN | 103795763 A | 5/2014 |
| WO | 2010019364 A1 | 2/2010 |
| WO | 2014021770 A2 | 2/2014 |

OTHER PUBLICATIONS

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.0.0, 3GPP Organizational Partners, Mar. 2013, 228 pages.

Ericsson, "R2-060072: Placement of eRRC and MAC Control Plane Functions," Third Generation Partnership Project (3GPP), TSG-RAN WG2 Meeting #50, Jan. 9-13, 2006, 5 pages, Sophia Antipolis, France.

Qualcomm Europe, "SRJ-050189: Signaling optimization for E-UTRAN," Third Generation Partnership Project (3GPP), RAN2, Ran3, SA2 Joint Session on LTE, Sep. 1-2, 2005, 8 pages, London, England.

Siemens, "R3-051127: Discussion on O&M, RRM and others for the E-UTRAN architecture," Third Generation Partnership Project (3GPP), TSG RAN WG3 Meeting #48bis, Oct. 11-14, 2005, 4 pages, Cannes, France.

International Search Report and Written Opinion for International Patent Application No. PCT/EP2016/053143, dated Dec. 6, 2016, 11 pages.

Examination Report for Indian Patent Application No. IN201837027814, dated Aug. 7, 2020, 5 pages.

Grant of Patent for Korean Patent Application No. KR10-2018-7026197, dated Jun. 29, 2020, 2 pages.

ZTE, "R3-140747: CN Assistance information for eNB parameters tuning," Change Request, TSG-RAN WG3 Meeting #83bis, Mar. 31-Apr. 4, 2014, San Jose del Cabo, Mexico, 6 pages.

Office Action for Chinese Patent Application No. 201680081760.7, dated Nov. 20, 2020, 10 pages.

\* cited by examiner

CENTRAL NODE MANAGEMENT OF UE CONTEXT

This application is a 35 U.S.C. § 371 national phase filing of International Application No. PCT/EP2016/053143, filed Feb. 15, 2016, the disclosure of which is incorporated herein by reference in its entirety.

TECHNICAL FIELD

The invention relates to a method of a node in a communications network of enabling communication with at least one wireless communication terminal served by the communications network, a method of a first network entity in a communications network of enabling communication with at least one wireless communication terminal served by the communications network, the node performing the method, and the first network entity performing the method.

BACKGROUND

In an Evolved 3rd Generation Partnership Project (3GPP) Packet Switched Domain, also known as the Evolved Packet System (EPS), Internet Protocol (IP) connectivity is provided to communication terminals commonly referred to as User Equipment (UE), e.g. smart phones, tablets, laptops, gaming consoles, etc., via radio base stations known as eNodeBs.

The eNodeBs communicate with the UEs over an air interface and form the Evolved Universal Terrestrial Radio Access Network (E-UTRAN) of the EPS for connecting the UEs to a core network referred to as Evolved Packet Core (EPC), which together with the E-UTRAN forms the EPS, and further on to a Packet Data Network (PDN).

The eNodeBs are operatively connected to a Mobility Management Entity (MME) and to a Serving Gateway (SGW) of the EPC, in turn operatively connected to the MME and a Packet Data Network Gateway (PGW), which in turn is operatively connected to a Policy and Charging Rules Function (PCRF), and which PGW further provides connectivity to the UEs to external PDNs by being the point of exit and entry of traffic for the UE with respect to the PDNs. A UE may have simultaneous connectivity with more than one PGW for accessing multiple PDNs.

The EPC comprises a number of entities (i.e. MME, SGW, PGW, etc.) interacting to ultimately provide the UEs with requested PDN services.

Assuming for instance that a user moves outside her allocated Tracking Area (TA), being an area where a user can move around without updating the MME accordingly. When the user moves outside her allocated TA, her UE must perform a Tracking Area Update (TAU) with the MME of the new TA. The new MME will fetch UE context from the old MME; the UE context is a block of information in the MME associated with an active UE, and contains the necessary information required to maintain services towards the active UE, for instance UE state information, security information, UE capability information, UE identity, etc.

There are different UE contexts stored in different entities of the EPS; the UE-related context stored at an MME is referred to as "Mobility Management (MM) context", while e.g. the UE-related context stored at an eNodeB is referred to as "eNB UE context", and so on. Hence, each entity in the EPS stores its own UE context.

So, upon performance of for instance a TAU, a great deal of signalling is required in the EPC, and most or all of the entities are affected in that the UE context associated with each entity (i.e. MME, SGW, PGW, etc.) must be updated due to the change of TA. The current UE context associated with each entity thus effectively represents a current state of the entity which changes with updated/new UE contexts. Hence, failure of an entity may cause problems in the EPS, since the most current UE context of the failed entity typically is lost, which may require a UE context reload to the failed entity, and possibly also to further entities the UE context of which is being affected by the failure.

This is one example only, and many situations arise in a 3GPP network where extensive UE context signalling among the network entities is required to occur.

SUMMARY

An object of the present invention is to solve, or at least mitigate, this problem in the art and to provide an improved method of enabling communication with wireless communication terminals served by a communications network.

This object is attained in a first aspect of the invention by a method of a node in a communications network of enabling communication with at least one wireless communication terminal served by the communications network, the node being operatively connected to a plurality of network entities in the communications network. The method comprises storing at least one current UE context of the at least one communication terminal to be used by a first network entity of the plurality of network entities in the communications network, and receiving, from a second network entity of the plurality of network entities, a message intended for the first network entity. The method further comprises delivering at least a part of the received message to the first network entity and at least a part of the stored at least one current UE context to be used by the first network entity.

This object is attained in a second aspect of the invention by a node configured to enable communication with at least one wireless communication terminal served by a communications network, the node (20) being arranged to be operatively connected to a plurality of network entities in the communications network and comprising a processing unit and a memory, said memory containing instructions executable by said processing unit, whereby the node is operative to store at least one current UE context of said at least one communication terminal to be used by a first network entity of the plurality of network entities in the communications network, receive, from a second network entity of the plurality of network entities, a message intended for the first network entity, and deliver at least a part of the received message to the first network entity and at least a part of the stored at least one current UE context to be used by the first network entity.

This object is attained in a third aspect of the invention by a method of a first network entity in a communications network of enabling communication with at least one wireless communication terminal served by the communications network. The method comprises receiving, from a node in the communications network storing at least one current UE context of the at least one wireless communication terminal, a message from a second network entity and at least a part of the stored at least one current UE context to be used by the first network entity, and performing an action based on the received current UE context and the message.

This object is attained in a fourth aspect of the invention by a first network entity configured to enable communication with at least one wireless communication terminal served by a communications network (10), the network entity comprising a processing unit and a memory, said memory containing instructions executable by said processing unit, whereby said first network entity is operative to receive, from a node in the communications network storing at least one current UE context of said at least one wireless communication terminal, a message from a second network entity and at least a part of the stored at least one current UE context to be used by the first network entity, and perform an action based on the received current UE context and the message.

As has been discussed hereinabove, in order to perform required actions for initializing a service request for a wireless communication terminal (referred to as a UE) being served by a network, network entities must have access to the appropriate UE context, and the UE context of the respective network entity is held by the entity itself.

In an embodiment, a central node is arranged in the network, e.g. an EPC, and operatively connected to network entities such as e.g. eNodeB, SGW, MME, PGW, etc. The central node may be embodied in the form of a server having appropriate storage capacity and being arranged with a front end for communicating with the network entities.

The central node is arranged to store the UE context(s) to be used by the respective entity in the network. This advantageously relieves the entities to store and maintain (e.g. update) a current UE context associated with the respective entity, which current UE context reflects a current state of the entity which changes with updated/new UE contexts; for instance, the UE contexts may indicated new bearers the are established between the UE and the EPC, whether the UE enters a Discontinuous Reception (DRX) state, a change of TA for the UE, etc.

Thus, when e.g. an SGW wishes to perform control plane communication with an MME, the SGW will send the control plane message to the central node, and the central node will in its turn transmit (at least a part of) the message along with the current UE context to be used by the MME for performing any action stipulated by the control plane message.

Advantageously, the network entities (e.g. the MME, SGW, PGW, etc.) are made "stateless" by having the central node handle the UE contexts and hence corresponding UE states. As a result, failure of a network entity will not cause any greater problems in the EPS (in case of an LTE implementation), since the most current UE context of the failed entity is not lost, but held at the central node. It can be envisaged that the central node is made more resistant to failures than any one of the entities in the EPS by enhancing security functionality at the central node.

In a further embodiment, the central node may be configured to be aware of a first network entity which is to receive a message and UE context given a particular second entity submitting the message. For instance, if the second entity is an SGW, the first entity is an MME.

In an embodiment, the message received by the central node from a second network entity comprises an identifier identifying a first network entity to which the message is to be delivered.

In yet an embodiment, the message received by the central node comprises an identifier identifying the second network entity from which the message was submitted.

In still a further embodiment, the message received by the central node comprise an indication of data to be saved at the node on behalf of the second network entity from which the message is submitted.

Further provided is a computer program comprising computer-executable instructions for causing the node to perform steps according to an embodiment of the first aspect of the invention, when the computer-executable instructions are executed on a processing unit included in the node.

Further provided is a computer program product comprising a computer readable medium, the computer readable medium having the computer program of the node embodied thereon.

Still further provided is a computer program comprising computer-executable instructions for causing the first network entity to perform steps according to an embodiment of the third aspect of the invention, when the computer-executable instructions are executed on a processing unit included in the first network entity.

Yet further provided is a computer program product comprising a computer readable medium, the computer readable medium having the computer program of the first network entity embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
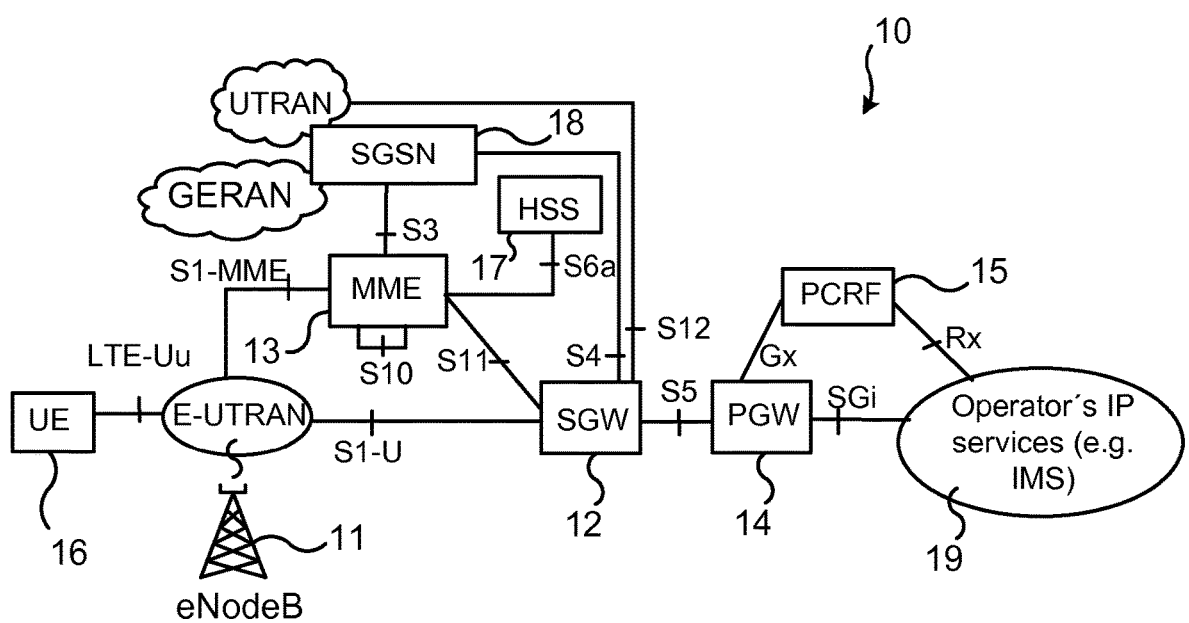
FIG. 1 shows a schematic overview of an exemplifying wireless communication system in which the present invention can be implemented.

FIG. 1 shows a schematic overview of an exemplifying wireless communication system 10 in which the present invention can be implemented. The wireless communication system to is an Long Term Evolution (LTE) based system. It should be pointed out that the terms "LTE" and "LTE based" system is here used to comprise both present and future LTE based systems, such as, for example, advanced LTE systems. It should be appreciated that although FIG. 1 shows a wireless communication system 10 in the form of an LTE based system, the example embodiments herein may also be utilized in connection with other wireless communication systems, such as e.g. Global System for Mobile Communications (GSM) or Universal Mobile Telecommunications System (UMTS), comprising nodes and functions that correspond to the nodes and functions of the system in FIG. 1.

The wireless communication system to comprises a base station in the form of an eNodeB 11, operatively connected to an MME 13 and to an SGW 12, in turn operatively connected to the MME 13, and a PGW 14, which in turn is operatively connected to a PCRF 15. The eNodeB 11 is a radio access node that interfaces with a mobile radio terminal, e.g. a UE 16. The eNodeB(s) of the system form the E-UTRAN for LTE communicating with the UE over an air interface such as LTE-Uu. The core network in LTE is known as EPC, and the EPC together with the E-UTRAN is referred to in LTE as the EPS. The SGW 12 routes and forwards user data packets over the S1-U interface, whilst also acting as the mobility anchor for the user plane during inter-eNodeB handovers and as the anchor for mobility between LTE and other 3GPP technologies (terminating S4 interface and relaying the traffic between 2G/3G systems and the PGW 14). For idle state UEs, the SGW 12 terminates the downlink (DL) data path and triggers paging when DL data arrives for the UE 16, and further manages and stores UE contexts, e.g. parameters of the IP bearer service, network internal routing information. It also performs replication of the user traffic in case of lawful interception. The SGW 12 communicates with the MME 13 via interface Sit and with the PGW 14 via the S5 interface. Further, the SGW 12 may communicate with the UMTS radio access network UTRAN and with the GSM EDGE ("Enhanced Data rates for GSM Evolution") Radio Access Network (GERAN) via the S12 interface.

The MME 13 is responsible for idle mode UE tracking and paging procedure including retransmissions. It is involved in the bearer activation/deactivation process and is also responsible for choosing the SGW 12 for a UE 16 at the initial attach and at time of intra-LTE handover involving core network node relocation. It is responsible for authenticating the user by interacting with the Home Subscriber Server (HSS) 17. The Non-Access Stratum (NAS) signaling terminates at the MME 13 and it is also responsible for generation and allocation of temporary identities to UEs via the S1-MME interface. It checks the authorization of the UE 16 to camp on the service provider's Public Land Mobile Network (PLMN) and enforces UE roaming restrictions. The MME 13 is the termination point in the network for ciphering/integrity protection for NAS signaling and handles the security key management. Lawful interception of signaling is also supported by the MME. The MME 13 also provides the control plane function for mobility between LTE and 2G/3G access networks with the S3 interface terminating at the MME 13 from a Serving GPRS ("General Packet Radio Service") Support Node (SGSN) 18. The MME 13 also terminates the S6a interface towards the home HSS 17 for roaming UEs. Further, there is an interface S10 configured for communication between MMEs for MME relocation and MME-to-MME information transfer.

The PGW 14 provides connectivity to the UE 16 to external PDNs 19 by being the point of exit and entry of traffic for the UE 16. A UE may have simultaneous connectivity with more than one PGW for accessing multiple PDNs. The PGW 14 performs policy enforcement, packet filtering for each user, charging support, lawful interception and packet screening. Another key role of the PGW 14 is to act as the anchor for mobility between 3GPP and non-3GPP technologies such as WiMAX and 3GPP2 (CDMA 1× and EvDO). The interface between the PGW 14 and the packet data network is referred to as the SGi. The packet data network may be an operator external public or private packet data network or an intra operator packet data network, e.g. for provision IP Multimedia Subsystem (IMS) services.

The PCRF 15 determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF 15 provides the PGW 14 with such rules and/or policies or similar to be used by the acting PGW as a Policy and Charging Enforcement Function (PCEF) via interface Gx. The PCRF further communicates with the packet data network via the Rx interface.

As previously has been discussed, each network entity (e.g. eNodeB, MME, SGW, PGW, etc.) must store its own UE context which continuously must be updated to reflect a current state of the system, which is problematic in case of failure of one or more entities.

Figure 2:
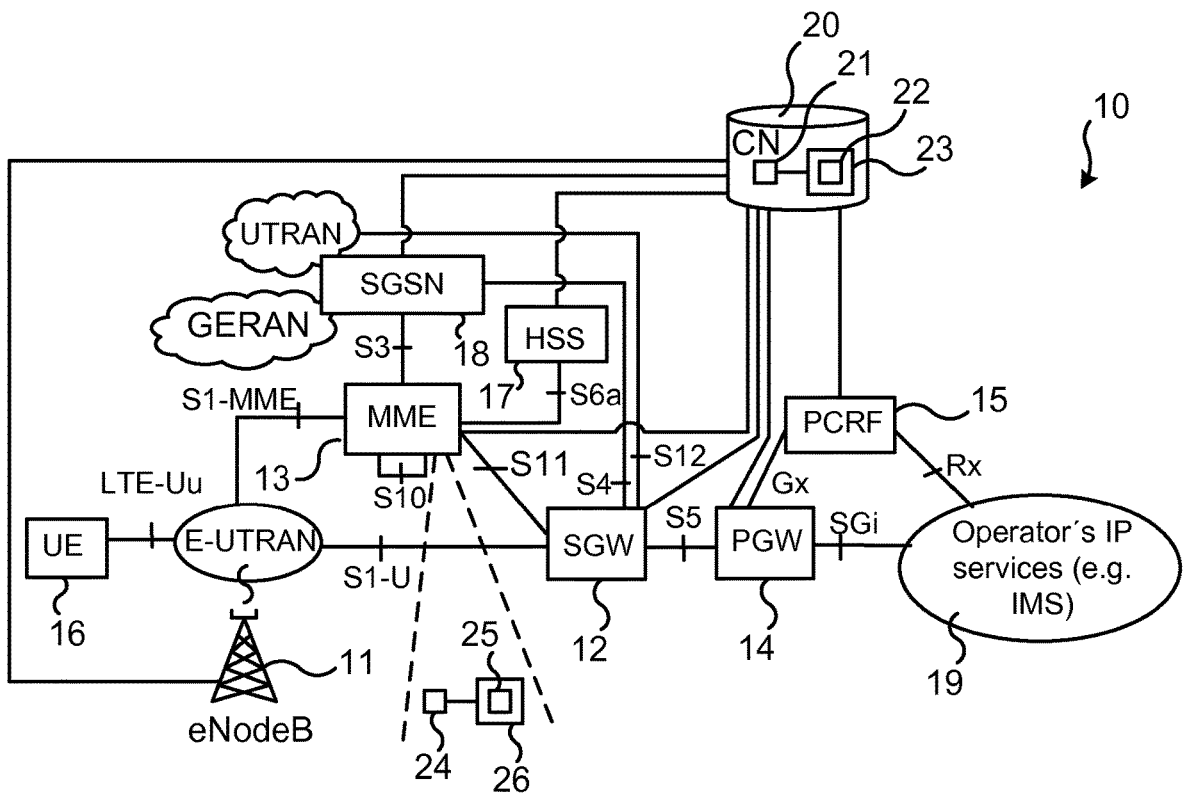
FIG. 2 shows a schematic overview of the wireless communication system of FIG. 1 with a central node according to an embodiment implemented.

FIG. 2 illustrates an embodiment of the invention where a central node (CN) 20 is implemented in the system to as a part of the EPS, which central node 20 is configured to store current UE contexts for a plurality of UEs where each UE context is associated with a network entity, i.e. the UE context of the MME 13, the UE context of the SGW 12, the UE context of the eNodeB 11, and so on. In other words, the CN 20 is arranged to store the UE context to be used by the respective entity in the network, and is further arranged with a front end serving as an interface via which the CN 20 communicates with the respective network entity.

Advantageously, this enables the network entities of the EPS to become stateless. Hence, no single entity needs to store and continuously update its "stateful" UE context to reflect a current state of the system to.

When a first network entity of the EPS wishes to communicate with a second network entity, the communication will occur via the central node 20.

As further illustrated, the CN 20 comprises a processing unit 21, and a computer program 22 downloaded to a suitable storage medium 23. Further, the respective entity, in this example illustrated by means of the SGW 12, typically also comprises a processing unit 24, and a computer program 25 downloaded to a suitable storage medium 26. This will be described in more detail subsequently.

Figure 3:
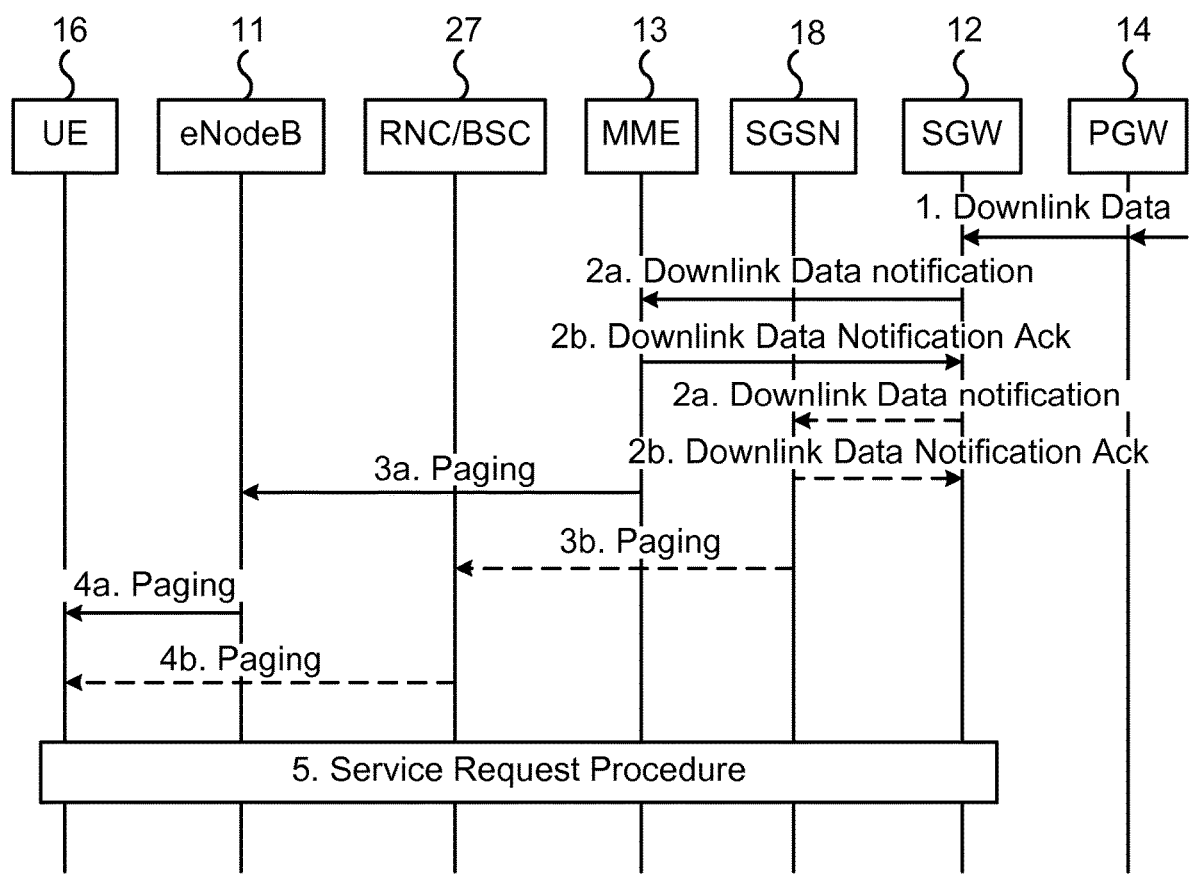
FIG. 3 illustrates a prior art network triggered service request procedure.

FIG. 3 illustrates a prior art network triggered service request procedure as described in 3GPP specification TS 23.401, which subsequently will be used to further illustrate an embodiment of the invention.

In the prior art procedure, the PGW 14 receives from the PDN 19 (not shown in FIG. 3) data packets ultimately intended for the UE 16 and submits the downlink (DL) data to the SGW 12 in step 1.

When the SGW 12 in step 1 receives the DL data packet/control signalling for the UE 16 that is not user plane connected (i.e. the UE is Idle)—and the UE context data associated with the SGW 12 (also known as the "SGW context data") hence indicates no DL user plane Tunnel Endpoint Identifier (TEID)—it buffers the DL data packet and identifies which of the MME 13 or SGSN 18 is serving the UE 16.

In this example, the MME 13 is assumed to serve the UE 16. The SGW 12 consequently sends a downlink data notification to the MME 13 in step 2*a*, which replies with an acknowledgement accordingly in step 2*b*.

At the MME 13, it is detected from the UE context held by the MME 13 (referred to as "MME context") whether the UE 16 is available, and the SGW 12 is notified accordingly in the acknowledgement of step 2*b*.

Thus, if the UE 16 is registered in the MME 13 and considered reachable for paging, the MME 13 sends a Paging message to the eNodeB 11 in step 3*a* (or rather to each eNodeB belonging to the tracking area(s) in which the UE 16 is registered).

The eNodeB 11 pages the UE 16 in step 4*a*, and in step 5, a radio bearer is established between the UE 16 and the EPC in order to transfer the PDN packet data initially received by the PGW 14 from the PDN 19. The SGW 12 will thus deliver user plane data to the UE 16 via the eNodeB 11 when the radio bearer is established. As is indicated with the dashed arrows, should the SGSN 18 had been the entity serving the UE 16, DL data notification/acknowledgement would have been performed between the SGSN 18 and the SGW 12 in steps 2*a* and 2*b*, and paging would have been effected via Radio Network Controller/Base Station Controller 27 (RNC/BSC) in steps 3*a* and 3*b*.

From FIG. 3 it can be concluded that, in order to perform required actions for initializing a service request, each network entity must have access to the appropriate UE context, and the UE context of the respective entity is held by the entity itself.

Figure 4:
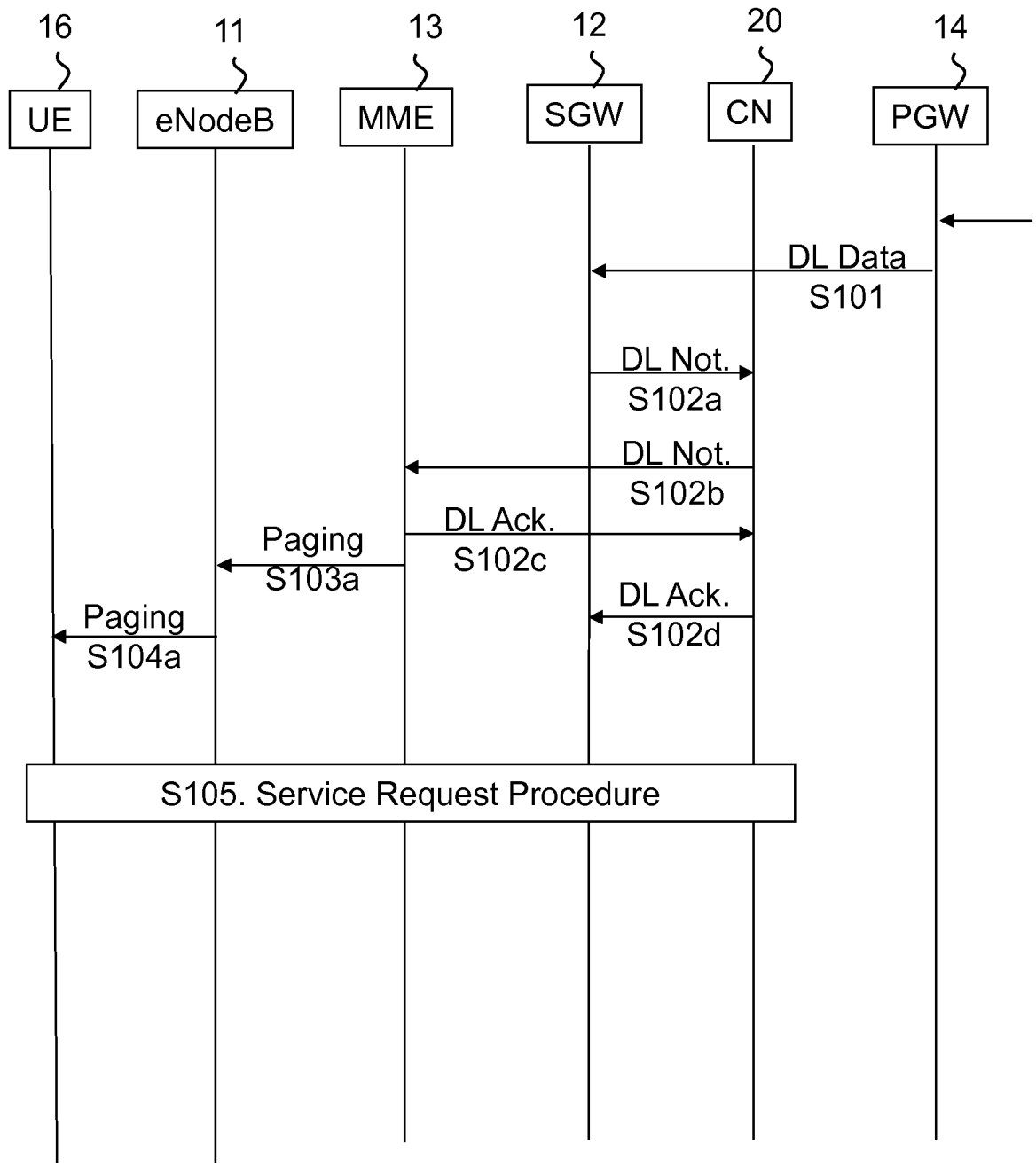
FIG. 4 illustrates a network triggered service request procedure according to an embodiment of the invention.

FIG. 4 illustrates an embodiment of the invention, where a central node (CN) 20 is arranged in the EPC and operatively connected to network entities, e.g. such as the eNodeB 11, SGW 12, MME 13 and the PGW 14.

The CN 20 is arranged to store the UE context(s) to be used by the respective entity in the network. This advantageously relieves the entities to store and maintain (e.g. update) a current UE context associated with the respective entity, which current UE context reflects a current state of the entity which changes with updated/new UE contexts; for instance, the UE contexts may indicated new bearers the are established between the UE and the EPC, whether the UE enters a Discontinuous Reception (DRX) state, a change of TA for the UE, etc.

Advantageously, the entities (e.g. the MME, SGW, PGW, etc.) are made "stateless" by having the CN 20 handle the UE contexts and hence corresponding UE states. As a result, failure of a network entity will not cause any greater problems in the EPS, since the most current UE context of the failed entity is not lost, but held at the CN 20. It can be envisaged that the CN 20 is made more resistant to failures than any one of the entities in the EPS by enhancing security functionality at the CN 20.

Reference is now made to FIG. 4, which illustrates an example of a network triggered service request procedure in a network where a CN 20 according to an embodiment is implemented. It should be noted that this is an example procedure where the CN 20 manages UE contexts on behalf of network entities; the CN 20 could be implemented to handle any appropriate communication procedure where UE contexts are to be handled for network entities.

When the PGW 14 receives data packets from the PDN 19 (not shown in FIG. 4) ultimately intended for the UE 16, the PGW 14 submits the DL data to the SGW 12 in step S101.

The SGW 12 identifies the MME 13 serving the UE 16, and sends a DL data notification to the CN 20 in step S102*a*, which in turn sends the DL data notification to the MME 13 in step S102*b* along with relevant UE context for the MME 13.

It should be noted that the CN 20 may be configured to be aware of a destination entity given a particular source entity. For instance, if the source entity is the SGW 12, the destination entity is bound to be the MME 13.

In an embodiment of the invention, when a control plane message is sent, it is configured to comprise an identifier identifying the destination entity to which the message is to be delivered. The CN 20 needs to be aware of the type of entity to which the message is to be delivered, in order to append the correct UE context to the message. As previously mentioned, an MME will use a particular UE context while e.g. an SGW will use another UE context.

For instance, a GPRS Tunneling Protocol (GTP) header of a message may indicate the intended entity to receive the message and the appropriate UE context. A TEID in the header may thus indicate the particular receiver (TEID=MME, TEID=SGW, etc.).

Further, the message received at the CN 20 may indicate the particular entity from which it is received.

The CN 20 hence receives the DL data notification in step S102*a*, and forwards the DL data notification in step S102*b* along with the current UE context relevant for the MME 13 (indicating no DL user plane TEID), which UE context is stored at the CN 20.

At the MME 13, it is detected based on the UE context received in step S102*b* whether the UE 16 is available. Thus, the MME 13 may send a DL data notification acknowledgement in step S102*c* to the CN 20, and the SGW 12 is notified accordingly via the CN 20 in step S102*d*, where any relevant UE context associated with the SGW 12 is supplied by the CN 20.

If the UE 16 is registered in the MME 13 and considered reachable for paging, the MME 13 sends a Paging message to the eNodeB 12 in step S103*a*.

The eNodeB 11 pages the UE 16 in step S104*a*, and in step S105, a radio bearer is established between the UE 16 and the EPC in order to transfer the PDN packet data initially received by the PGW 14 from the PDN 19. The SGW 12 will thus deliver user plane data to the UE 16 via the eNodeB 11 when the radio bearer is established.

From FIG. 4 it can be concluded that EPS entities advantageously are relieved from the burden of storing (and updating) and UE context, and are thus made stateless, while the only "stateful" entity remaining in the EPS is the CN 20.

Further, by storing the UE context associated with each network entity at the CN 20, maintenance of UE context becomes easier, since all UE contexts are located at the CN 20. Advantageously, maintenance of a single node, i.e. the CN 20, is sufficient instead of performing maintenance of each individual network entity.

Figure 5:
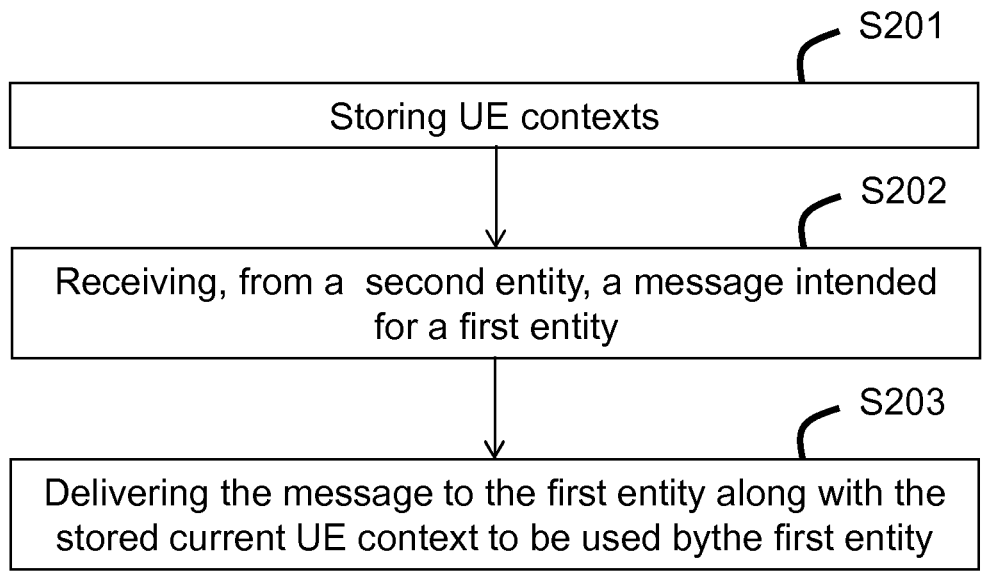
FIG. 5 illustrates a flowchart of a method of a central node according to an embodiment.

FIG. 5 illustrates a flowchart of a method performed at the CN 20 in an exemplifying embodiment in a communications network 10 for enabling communication with a wireless communication terminal 16 served by the network 10. The node is operatively connected to a plurality of entities in the communications network, in FIG. 2 illustrated by means of eNodeB 11, SGW 12, MME 13, PGW 14, PCRF 15, HSS 17 and SGSN 18.

In a first step S201, the CN 20 typically stores a plurality of current UE contexts but at least a current UE context of the wireless communication terminal 16 to be used by at least one of the plurality of network entities 11, 12, 13, 14, 15, 17 and 18 in the communications network 10.

When a network entity wishes to communicate with another one of the network entities in the network 10, such as e.g. the SGW 12 communicating with the MME 13, the control plane communication will go via the CN 20.

Hence, in step S202, the CN 20 receives, from a network entity, in this case the SGW 12, a control plane message intended for another one of the network entities, in this case the MME 13.

In step S203, the CN 20 delivers at least a part of the control plane message to the MME 13 and at least a part of the stored current UE context to be used by the MME 13, thereby advantageously relieving the SGW 12 and/or the MME 13 from storing and maintaining current UE context of the wireless communication terminal 16 to be used by the MME 13, and consequently making the SGW 12 and/or the MME 13 stateless.

In order to find the correct UE context out of the potentially large number of UE contexts stored at the CN 20, the message received at the CN 20 may comprise a TEID or any other appropriate identifier for identifying the particular UE 16, e.g. such as the GUTI and/or the IMSI or similar identifier identifying the UE 16.

Figure 6:
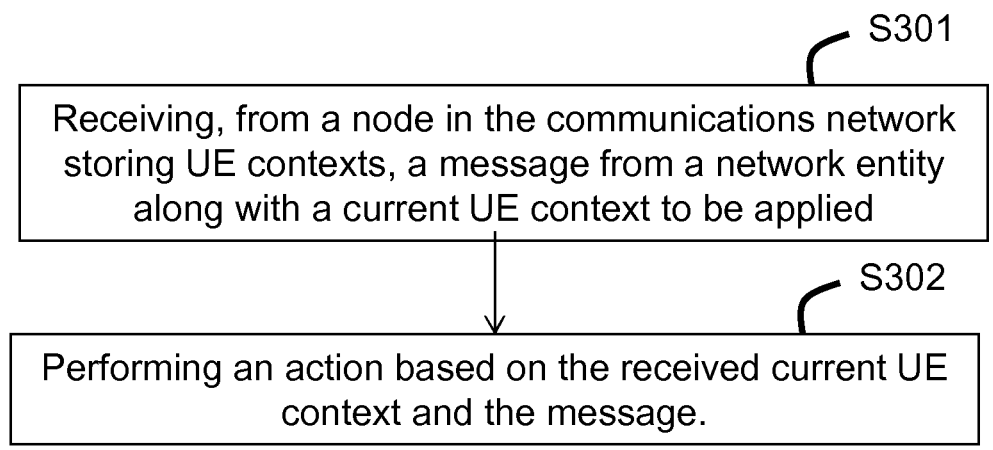
FIG. 6 illustrates a flowchart of a method of a network entity according to an embodiment.

FIG. 6 illustrates a flowchart of a method performed by a network entity, e.g. the MME 13, according to an exemplifying embodiment in a communications network 10 for enabling communication with a wireless communication terminal 16 served by the network 10.

In step S301, the MME 13 receives from the CN 20 a control plane message from another network entity, e.g. the SGW 12, and at least a part of a current UE context associated with the MME 13, which UE context is to be used by the MME 13.

For instance, as was discussed with reference to FIG. 4, the PGW 14 receives from the PDN 19 data packets ultimately intended for the UE 16 and submits the DL data to the SGW 12 in step 101, which responds by sending a DL data notification (preferably in the form of a control plane message) to the CN 20 in step S102a, which in its turn sends control plane message, i.e. the DL data notification, to the MME 13 in step S102b along with relevant UE context for the MME 13.

The CN 20 hence receives the DL data notification in step S102a from the SGW 12, and forwards the notification along with the current UE context relevant for the MME 13 in step S102b, which UE context is stored at the CN 20.

As is shown in step S302 of FIG. 5, the MME 13 performs an action based on the received current UE context and the control plane message.

Thus, in this particular example, again with reference to FIG. 4, the UE context associated with the MME 13, as received from the CN 20 with the DL data notification in step S102b, indicates that the UE 16 is not user plane connected. Based on that particular UE context and the content of the control plane message (i.e. "PDN data available for delivery to the UE") the MME 13 will act accordingly, in this particular example by performing the action of paging UE 16 via the eNodeB 11 in steps S103a and S104a (and optionally by sending the DL data acknowledgement to the CN 20 in step S102c).

With reference to FIGS. 5 and 6, as well as to the network of FIG. 2, the steps of the method performed by the CN 20, being e.g. a server, and a network entity, embodied e.g. by the MME 13, respectively, according to embodiments are in practice performed by a processing unit 21, 24 embodied in the form of one or more microprocessors arranged to execute a computer program 22, 25 downloaded to a suitable storage medium 23, 26 associated 3o with the microprocessor, such as a Random Access Memory (RAM), a Flash memory or a hard disk drive. The respective processing unit 21, 24 is arranged to cause the CN 20 and the MME 13 to carry out the method according to embodiments when the appropriate computer program 23, 25 comprising computer-executable instructions is downloaded to the storage medium 23, 26 and executed by the processing unit 21, 24. The storage medium 23, 26 may also be a computer program product comprising the computer program 22, 25. Alternatively, the computer program 22, 25 may be transferred to the storage medium 23, 26 by means of a suitable computer program product, such as a Digital Versatile Disc (DVD) or a memory stick. As a further alternative, the computer program 22, 25 may be downloaded to the storage medium 23, 26 over a network. The processing unit 21 24 may alternatively be embodied in the form of a digital signal processor (DSP), an application specific integrated circuit (ASIC), a field-programmable gate array (FPGA), a complex programmable logic device (CPLD), etc.

Hence, the functionality of the CN 20 and the MME 13 may be embodied in software, hardware, or a combination thereof.

In an embodiment, a network entity may advantageously indicate with the message to the CN 20 control plane data to be stored by the CN 20 on behalf of the network entity.

Either the control plane data to be stored by the CN 20 is delivered with the message or, if the control plane data is already located at the CN 20, the indication may that the control plane data already available at the CN 20 is stored for possible future use by the source entity.

As an example, in 3GPP, an eNB UE S1AP ID ("S1 Application Protocol") is allocated so as to uniquely identify a UE 16 over the S1 interface within an eNodeB 11. When an MME 13 receives an eNB UE S1AP ID it shall store it for the duration of the UE-associated logical S1-connection for this UE 16. Once known to an MME 13, this Information Element (IE) is included in all UE associated S1-AP signalling. The MME 13 may indicate to the CN 20 that the eNB UE S1AP ID should be stored at the CN 20 on behalf of the MME 13 for possible future use. In case of failure of the MME 13, the CN 20 can supply the MME 13 with the eNB UE S1AP ID such that operation of the MME 13 may resume.

In a further embodiment, the entities of the communication network are implemented as Virtual Machines (VMs), where e.g. the MME 13 would become a Virtual MME (vMME). Thus, all or part of the network entities may advantageously by implemented as computing resources in the so called "cloud". Cloud computing services generally consist of two main parts; cloud infrastructure such as computing, network and storage resources, and software functions executing on said infrastructure. The software functions are oftentimes implemented in what is commonly known as Virtual Network Functions (VNFs) comprising one or more VMs executing various software to attain particular functionality, instead of using custom hardware to perform the intended functions.

To reduce equipment costs, power consumption, as well as reducing deployment and maintenance cost, virtualization technology is advantageously envisaged in an embodiment.

Figure 7:
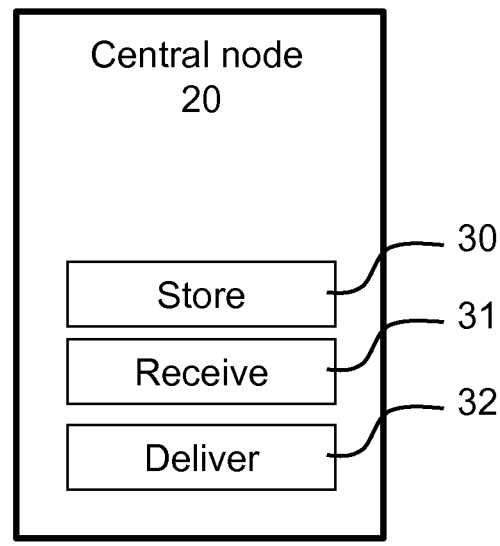
FIG. 7 illustrates a node according to an embodiment.

FIG. 7 illustrates a node 20 of enabling communication with at least one wireless communication terminal served by a communications network according to a further embodiment. The node 20 is arranged to be operatively connected to a plurality of network entities in the communications network, The node 20 comprises storing means 3o adapted to store at least one current UE context of the at least one communication terminal to be used by a first network entity of the plurality of network entities in the communications network, receiving means 31 adapted to receive, from a second network entity of the plurality of network entities, a message intended for the first network entity, and delivering means 32 adapted to deliver at least a part of the received message to the first network entity and at least a part of the stored at least one current UE context to be used by the first 3o network entity.

The means 30-32 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 8:
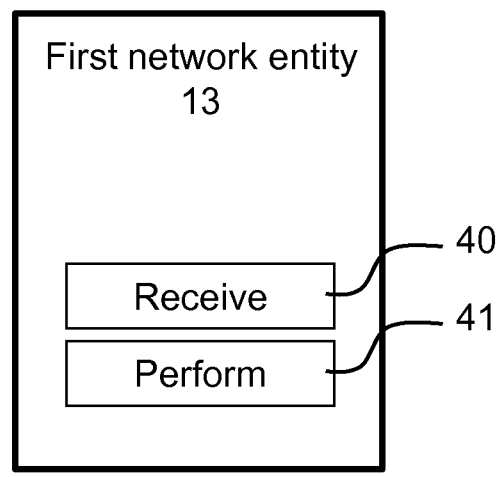
FIG. 8 illustrates a network entity according to an embodiment.

FIG. 8 illustrates a first network entity 13 of enabling communication with at least one wireless communication terminal served by a communications network according to a further embodiment.

The first network entity 13 comprises receiving means 40 adapted to receive, from a node in the communications network storing at least one current UE context of the at least one wireless communication terminal, a message from a second network entity and at least a part of the stored at least one current UE context to be used by the first network entity, and performing means 41 adapted to perform an action based on the received current UE context and the message.

The means 41, 42 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a central node in a communications network of enabling communication with at least one wireless communication terminal served by the communications network, in which the central node is operatively connected to a plurality of network entities in the communications network, wherein the central node is not a Mobility Management Entity or a Serving Gateway, comprising:
storing a plurality of current User Equipment, UE, contexts, which are to be used by the plurality of network entities to perform actions for initializing a service request of a corresponding UE, wherein:
the plurality of network entities-comprises at least two types of network entities other than a type of the central node;
each of the plurality of current UE contexts is to be used by a corresponding network entity of the plurality of network entities, to perform a corresponding action for initializing the service request of the corresponding UE; and
the plurality of current UE contexts includes at least one current UE context of said at least one wireless communication terminal to be used by a first network entity of the plurality of network entities in the communications network;
receiving, from a second network entity of the plurality of network entities, a message intended for the first network entity; and
delivering at least a part of the received message to the first network entity and at least a part of the stored at least one current UE context to be used by the first network entity.

2. The method of claim 1, wherein the received message comprises an identifier identifying said first network entity to which the message is to be delivered.

3. The method of claim 1, wherein the received message comprises an identifier identifying said second network entity from which the message is received.

4. The method of claim 1, wherein the received message comprises an indication of data to be saved at the central node on behalf of said second network entity from which the message is received.

5. The method of claim 1, wherein the storing of said at least one current UE context comprises:
updating the stored at least one current UE context to store a most current UE context.

6. A method of a first network entity in a communications network of enabling communication with at least one wireless communication terminal served by the communications network, which contains a plurality of network entities including the first network entity, comprising: receiving, from a central node in the communications network, wherein the central node is not a Mobility Management Entity or a Serving Gateway, at least a part of a message and at least a part of at least one current User Equipment, UE, context of said at least one wireless communication terminal to be used to perform a first action for initializing a service request of a corresponding UE by the first network entity, wherein: the message is provided by a second network entity of the plurality of network entities; and the central node stores a plurality of current UE contexts, which are to be used to perform actions for initializing the service request of the corresponding UE by the plurality of network entities that comprises at least two types of network entities other than a type of the central node, wherein each of the plurality of current UE contexts is to be used by a corresponding network entity of the plurality of network entities, and the plurality of current UE contexts includes the at least one current UE context to be used by the first network entity; and performing the first action based on the received part of the stored at least one current UE context and the message.

7. The method of claim 1, wherein the first and second network entities are provided in the communications network as Virtual Machines, VMs.

8. The method of claim 1, wherein the message is a control plane message.

9. A central node, which is not a Mobility Management Entity or a Serving Gateway, configured to enable communication with at least one wireless communication terminal served by a communications network, the central node being arranged to be operatively connected to a plurality of network entities in the communications network and comprising a processing unit and a memory, said memory containing instructions executable by said processing unit, whereby said central node is operative to:
  store a plurality of current User Equipment, UE, contexts, which are to be used by the plurality of network entities to perform actions for initializing a service request of a corresponding UE, wherein:
    the plurality of network entities-comprises at least two types of network entities other than a type of the central node;
    each of the plurality of current UE contexts is to be used by a corresponding network entity of the plurality of network entities, to perform a corresponding action for initializing the service request of the corresponding UE; and
    the plurality of current UE contexts includes at least one current UE, context of said at least one wireless communication terminal to be used by a first network entity of the plurality of network entities in the communications network;
  receive, from a second network entity of the plurality of network entities, a message intended for the first network entity; and
  deliver at least a part of the received message to the first network entity and at least a part of the stored at least one current UE context to be used by the first network entity.

10. The central node of claim 9, wherein the received message is configured to comprise an identifier identifying said first network entity to which the message is to be delivered.

11. The central node of claim 9, wherein the received message is configured to comprise an identifier identifying said second network entity from which the message is received.

12. The central node of claim 9, wherein the received message is configured to comprise an indication of data to be saved at the central node on behalf of said second network entity from which the message is received.

13. The central node of claim 9, further being operative to:
  update the stored at least one current UE context to store a most current UE context.

14. A first network entity configured to enable communication with at least one wireless communication terminal served by a communications network, which contains a plurality of network entities including the first network entity, the first network entity comprising a processing unit and a memory, said memory containing instructions executable by said processing unit, whereby said first network entity is operative to:
  receive, from a central node in the communications network, at least a part of a message and at least a part of at least one current User Equipment, UE, context of said at least one wireless communication terminal to be used to perform a first action for initializing a service request of a corresponding UE by the first network entity, wherein:
    the central node is not a Mobility Management Entity or a Serving Gateway;
    the message is provided by a second network entity of the plurality of network entities; and
    the central node stores a plurality of current UE contexts, which are to be used to perform actions for initializing the service request of the corresponding UE by the plurality of network entities that comprises at least two types of network entities other than a type of the central node, wherein each of the plurality of current UE contexts is to be used by a corresponding network entity of the plurality of network entities, and the plurality of current UE contexts includes the at least one current UE context to be used by the first network entity; and
  perform the first action based on the received part of the stored at least one current UE context and the message.

15. A non-transitory computer-readable storage medium, which is not a Mobility Management Entity or a Serving Gateway, comprising a computer program product including instructions to cause at least one processor to:
  store a plurality of current User Equipment, UE, contexts, which are to be used by a plurality of network entities to perform actions for initializing a service request of a corresponding UE, wherein:
    the plurality of network entities-comprises at least two types of network entities other than a type of the non-transitory computer-readable storage medium;
    each of the plurality of current UE contexts is to be used by a corresponding network entity of the plurality of network entities, to perform a corresponding action for initializing the service request of the corresponding UE; and
    the plurality of current UE contexts includes at least one current UE context of at least one wireless communication terminal to be used by a first network entity of the plurality of network entities in a communications network;
  receive, from a second network entity of the plurality of network entities, a received message intended for the first network entity; and
  deliver at least a part of the received message to the first network entity and at least a part of the stored at least one current UE context to be used by the first network entity.

16. The method of claim 1, wherein the at least two types of network entities comprise at least two of the following types of network entities: radio base station, Serving Gateway, Mobility Management Entity, Packet Data Network Gateway, Policy and Charging Rules Function, Home Subscriber Server, and Serving General Packet Radio Service Support Node.

17. The method of claim 1, before delivering the at least a part of the received message and the at least a part of the stored at least one current UE context to the first network entity, further comprising:
  based on a type of the first network entity, appending at least a part of a correct current UE context to the at least a part of the received message, wherein the at least a part of a correct current UE context is the delivered at least a part of the at least one current UE context to be used by the first network entity.

18. The method of claim 1, wherein the plurality of network entities is relieved from storing the plurality of current UE contexts stored at the central node, such that each of the plurality of network entities does not hold any UE state with respect to the at least one wireless communication terminal.

* * * * *